(12) United States Patent
Boss et al.

(10) Patent No.: US 9,147,215 B2
(45) Date of Patent: Sep. 29, 2015

(54) DISCRETE, DEPLETING CHIPS FOR OBTAINING DESIRED SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 11/756,357

(22) Filed: May 31, 2007

(65) Prior Publication Data

US 2008/0301689 A1    Dec. 4, 2008

(51) Int. Cl.
*G06Q 30/08* (2012.01)

(52) U.S. Cl.
CPC ..................................... *G06Q 30/08* (2013.01)

(58) Field of Classification Search
None
See application file for complete search history.

(56) References Cited

U.S. PATENT DOCUMENTS

| 5,371,780 | A | 12/1994 | Amitay |
| 6,006,194 | A | 12/1999 | Merel |
| 6,236,981 | B1 | 5/2001 | Hill |
| 6,438,539 | B1 | 8/2002 | Korolev et al. |
| 6,550,881 | B1 | 4/2003 | Phillips |
| 6,553,568 | B1 | 4/2003 | Fijolek et al. |
| 6,678,700 | B1 | 1/2004 | Moore et al. |
| 6,732,140 | B1 | 5/2004 | McCue |
| 6,754,739 | B1 | 6/2004 | Kessler et al. |
| 6,842,899 | B2 | 1/2005 | Moody et al. |
| 6,859,927 | B2 | 2/2005 | Moody et al. |
| 6,925,493 | B1 | 8/2005 | Barkan et al. |
| 6,947,987 | B2 | 9/2005 | Boland |
| 6,968,323 | B1 | 11/2005 | Bansal et al. |
| 6,987,578 | B2 * | 1/2006 | Alexander .................. 358/1.15 |
| 7,062,559 | B2 | 6/2006 | Yoshimura et al. |
| 7,099,681 | B2 | 8/2006 | O'Neill |
| 7,103,580 | B1 | 9/2006 | Batachia et al. |
| 7,103,847 | B2 | 9/2006 | Alford, Jr. et al. |
| 7,177,832 | B1 | 2/2007 | Semret et al. |
| 7,177,838 | B1 * | 2/2007 | Ling ................................ 705/41 |
| 7,222,345 | B2 | 5/2007 | Gray et al. |
| 7,249,099 | B2 | 7/2007 | Ling |
| 7,266,523 | B2 | 9/2007 | Depura et al. |
| 7,401,035 | B1 | 7/2008 | Young |
| 7,634,430 | B2 | 12/2009 | Huberman et al. |
| 7,640,547 | B2 * | 12/2009 | Neiman et al. ................ 718/104 |
| 7,899,696 | B2 | 3/2011 | Boss et al. |

(Continued)

OTHER PUBLICATIONS

U.S. Appl. No. 11/756,426, Advisory Action dated Jun. 8, 2010, 3 pages.

(Continued)

*Primary Examiner* — Eric C Wai
(74) *Attorney, Agent, or Firm* — Lisa Ulrich; Hoffman Warnick LLC

(57) ABSTRACT

The present invention provides discrete, depleting chips for allocating computational resources for obtaining desired service level characteristics, wherein discrete chips deplete from a maximum allocated amount but may, in an optional implementation, be allowed to be replenished through the purchase of additional chips. A number of chips are assigned to a requestor/party, known as a business unit (BU), which could be a department, or group providing like-functionality services. In one implementation, the chips themselves could represent base monetary units integrated over time.

23 Claims, 5 Drawing Sheets

(56) References Cited

U.S. PATENT DOCUMENTS

| | | | |
|---|---|---|---|
| 7,899,697 | B2 | 3/2011 | Boss et al. |
| 8,041,600 | B2 | 10/2011 | Boss et al. |
| 8,140,446 | B2 | 3/2012 | Boss et al. |
| 8,332,859 | B2 | 12/2012 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1 | 5/2003 | Semret et al. |
| 2003/0101124 | A1 | 5/2003 | Semret et al. |
| 2003/0167329 | A1 | 9/2003 | Kurakake et al. |
| 2003/0216971 | A1 | 11/2003 | Sick et al. |
| 2003/0233305 | A1 | 12/2003 | Solomon |
| 2004/0010592 | A1 | 1/2004 | Carver et al. |
| 2004/0024687 | A1 | 2/2004 | Delenda |
| 2004/0059646 | A1 | 3/2004 | Harrington et al. |
| 2004/0083160 | A1 | 4/2004 | Byde et al. |
| 2004/0111308 | A1 | 6/2004 | Yakov |
| 2004/0133506 | A1 | 7/2004 | Glodjo et al. |
| 2004/0133609 | A1 | 7/2004 | Moore et al. |
| 2004/0149294 | A1 | 8/2004 | Gianchandani et al. |
| 2004/0230317 | A1 | 11/2004 | Kumar et al. |
| 2005/0055306 | A1 | 3/2005 | Miller et al. |
| 2005/0071182 | A1 | 3/2005 | Aikens et al. |
| 2005/0138621 | A1 | 6/2005 | Clark et al. |
| 2005/0141554 | A1 | 6/2005 | Hammarlund et al. |
| 2005/0144115 | A1 | 6/2005 | Brett |
| 2005/0149294 | A1 | 7/2005 | Gebhart |
| 2005/0192865 | A1 | 9/2005 | Boutilier et al. |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1 | 12/2005 | Friesen |
| 2005/0289043 | A1* | 12/2005 | Maudlin .................. 705/37 |
| 2006/0047550 | A1 | 3/2006 | Dineen et al. |
| 2006/0059075 | A1* | 3/2006 | Hurewitz .................. 705/37 |
| 2006/0069621 | A1 | 3/2006 | Chang et al. |
| 2006/0080210 | A1 | 4/2006 | Mourad et al. |
| 2006/0080224 | A1 | 4/2006 | Schuelke |
| 2006/0080438 | A1 | 4/2006 | Storrie |
| 2006/0149576 | A1 | 7/2006 | Ernest et al. |
| 2006/0149652 | A1 | 7/2006 | Fellenstein et al. |
| 2006/0167703 | A1 | 7/2006 | Yakov |
| 2006/0195386 | A1 | 8/2006 | Glodjo et al. |
| 2007/0087756 | A1 | 4/2007 | Hoffberg |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 | 4/2008 | Gates et al. |

OTHER PUBLICATIONS

U.S. Appl. No. 11/756,400, Advisory Action dated Jun. 8, 2010, 3 pages.
U.S. Appl. No. 11/756,360, Notice of Allowance and Fees Due dated May 19, 2010, 6 pages.
U.S. Appl. No. 11/756,325, filed May 31, 2007, Notice of Allowance and Fees due dated Jul. 14, 2010, 10 pages.
U.S. Appl. No. 11/755,985, filed May 31, 2007, Final Office Action dated Jul. 1, 2010, 23 pages.
U.S. Appl. No. 11/756,416, filed May 31, 2007, Notice of Allowance and Fees due dated Jun. 30, 2010, 4 pages.
U.S. Appl. No. 11/756,313, filed May 31, 2007, Office Action dated Jun. 29, 2010, 31 pages.
U.S. Appl. No. 11/756,386, filed May 31, 2007, Notice of Allowance and Fees due dated Jun. 29, 2010, 4 pages.
U.S. Appl. No. 11/756,400, filed May 31, 2007, Office Action dated Jun. 24, 2010, 12 pages.
U.S. Appl. No. 11/756,426, filed May 31, 2007, Office Action dated Jun. 24, 2010, 10 pages.
Ozsomer et al., "A Resource-Based Model of Market Learning in the Subsidiary: The Capabilities of Exploration and Exploitation", Journal of International Marketing, vol. 11, No. 3, 2003.
Staudenmayer, Nancy, "Interdependency: Conceptual, Empirical, and Practical Issues", The International Center for Research on the Management of Technology, Jun. 1997.
U.S. Appl. No. 11/756,360, Office Action dated Feb. 8, 2010.
U.S. Appl. No. 11/756,325, Office Action dated Feb. 2, 2010.
U.S. Appl. No. 11/755,985, Office Action, dated Jan. 29, 2010.
Araque Jr., Gerardo, U.S. Appl. No. 11/756,313, filed May 31, 2007, Office Action dated Mar. 25, 2011, 33 pages.
Rankins, William E., U.S. Appl. No. 11/756,374, filed May 31, 2007, Office Action dated Mar. 11, 2011, 17 pages.
Nguyen, Nga B., Lis. U.S. Appl. No. 11/756,406, filed May 31, 2007, Final Office Action dated Feb. 22, 2011, 15 pages.
Garg, Yogesh C., U.S. Appl. No. 11/756,442, filed May 31, 2007, Office Action dated Feb. 10, 2011, 35 pages.
Mahapatra et al., "Oracle Parallel Processing", Copyright 2000, O'Reilly & Associates.
Boss et al, U.S. Appl. No. 11/756,325, Office Action Communication, Apr. 27, 2009, 10 pages.
Boss et al, U.S. Appl. No. 11/756,360, Office Action Communication, Apr. 24, 2009, 12 pages.
Boss et al, U.S. Appl. No. 11/755,985, Office Action Communication, Apr. 1, 2009, 23 pages.
Araque Jr., Gerardo, U.S. Appl. No. 11/756,313, filed May 31, 2007, Final Office Action dated Dec. 10, 2010.
Lan, Tzu-Hsiang, U.S. Appl. No. 11/755,971, filed May 31, 2007, Office Action dated Nov. 26, 2010.
Rankins, William E., U.S. Appl. No. 11/756,374, filed May 31, 2007, Office Action dated Oct. 29, 2010. 35 pages.
Boss, U.S. Appl. No. 11/756,386, Office Action Communication, Oct. 8, 2009, 13 pages.
Boss, U.S. Appl. No. 11/756,400, Office Action Communication, Oct. 8, 2009, 18 pages.
Boss, U.S. Appl. No. 11/756,360, Office Action Communication, Oct. 14, 2009, 13 pages.
Boss, U.S. Appl. No. 11/756,325, Office Action Communication, Oct. 13, 2009, 12 pages.
Boss, U.S. Appl. No. 11/756,416, Office Action Communication, Oct. 14, 2009, 16 pages.
Boss, U.S. Appl. No. 11/755,985, Office Action Communication, Nov. 2, 2009, 16 pages.
Boss, U.S. Appl. No. 11/756,426, Office Action Communication, Oct. 29, 2009, 20 pages.
Duermeyer, Karin, "Methodology: From Component Business Model to Service Oriented Architecture", IBM Business Consulting Services, Nuernberger Kreis—Softwaretag: May 7, 2004, 41 pages.
Carter, Candice D., U.S. Appl. No. 11/756,426, filed May 31, 2007, Notice of Allowance and Fees Due dated Oct. 20, 2010, 27 pages.
Gregg, Mary M., U.S. Appl. No. 11/755,985, filed May 31, 2007, Office Action dated Oct. 2010, 27 pages.
Carter, Candice D., U.S. Appl. No. 11/756, 400, filed May 31, 2007, Notice of Allowance and Fees Due, 26 pages.
Nguyen, Nga, B., U.S. Appl. No. 11/756,406, filed May 31, 2007, Office Action dated Aug. 17, 2010, 32 pages.
U.S. Appl. No. 11/756,426, filed May 31, 2007, Final Office Action dated Mar. 24, 2010, 20 pages.
U.S. Appl. No. 11/756,416, filed May 31, 2007, Final Office Action dated Mar. 24, 2010, 14 pages.
U.S. Appl. No. 11/756,400, filed May 31, 2007, Final Office Action dated Mar. 24, 2010, 20 pages.

(56) References Cited

OTHER PUBLICATIONS

U.S. Appl. No. 11/756,386, filed May 31, 2007, Final Office Action dated Mar. 24, 2010, 14 pages.
Gregg, U.S. Appl. No. 11/755,985, Office Action Communication, May 5, 2011, 35 pages.
The University of Melbourne: Annual Budget 2004, 84 pages: www.unimelb.edu.au/publications/docs/budget2004.pdf.
Carter, U.S. Appl. No. 11/756,416, Notice of Allowance & Fees Due, May 17, 2011, 19 pages.
Lan, U.S. Appl. No. 11/755,971, Office Action Communication, May 19, 2011, 16 pages.
Carter, U.S. Appl. No. 11/756,360, Notice of Allowance & Fees Due, May 20, 2011, 19 pages.
Carter, U.S. Appl. No. 11/756,386, Notice of Allowance & Fees Due, May 23, 2011, 19 pages.
Wai, U.S. Appl. No. 11/756,367, Office Action Communication, Jun. 13, 2011, 38 pages.
Nisan, "Bidding and Allocation in Combinatorial Auctions", Proceedings of the 2nd ACM Conference on Electronic Commerce, 2000, 12 pages.
Araque, Jr., U.S. Appl. No. 11/756,313, Office Action Communication, Aug. 29, 2011, 37 pages.
Garg, U.S. Appl. No. 11/756,442, Notice of Allowance & Fees Due, Sep. 12, 2011, 16 pages.
Chew, U.S. Appl. No. 11/755,980, Office Action Communication, Jun. 23, 2011, 50 pages.
Garg, U.S. Appl. No. 11/756,442, Office Action Communication, Jun. 24, 2011, 8 pages.
Rankins, U.S. Appl. No. 11/756,374, Office Action Communication, Aug. 19, 2011, 19 pages.
Chew, U.S. Appl. No. 13/571,904, Office Action, Mar. 28, 2013, 32 pages.
Chew, U.S. Appl. No. 11/755,980, Notice of Allowance & Fees Due, Aug. 6, 2012, 18 pages.
Lan, U.S. Appl. No. 11/755,971, Final Office Action, Nov. 21, 2012, 17 pages.
Nguyen, U.S. Appl. No. 11/756,406, Notice of Allowance and Fees Due dated Nov. 10, 2011, 19 pages.
Gregg, U.S. Appl. No. 11/755,985, Office Action Communication, Dec. 2, 2011, 75 pages.
Wai, U.S. Appl. No. 11/756,367, Office Action Communication, Dec. 9, 2011, 19 pages.
Rankins, U.S. Appl. No. 11/756,374, Notice of Allowance and Fees Due, Dec. 16, 2011, 22 pages.
Gaudiano et al., "Dynamic Resource Allocation for a Sensor Network", Manuscript #335, Jun. 1, 2005, 21 pages.
Glass, "Creating Socially Conscious Agents: Decision-Making in the Context of Group Commitments", Computer Science Group, Harvard University, Apr. 1999, 33 pages.
Chew, U.S. Appl. No. 11/755,980, Office Action Communication, Dec. 20, 2011, 32 pages.
Lan, U.S. Appl. No. 11/755,971, Notice of Allowance & Fees Due, Jul. 8, 2013, 12 pages.
Chew, U.S. Appl. No. 13/571,904, Notice of Allowance & Fees Due, Sep. 27, 2013, 11 pages.
Lan, U.S. Appl. No. 11/755,971, Office Action Communication, Jun. 22, 2012, 34 pages.
Lan, U.S. Appl. No. 11/755,971, Office Action, May 14, 2013, 16 pages.
Lan, U.S. Appl. No. 14/061,214, Office Action Communication, Jan. 17, 2014, 14 pages.
Wai, U.S. Appl. No. 11/756,367, Office Action, Sep. 25, 2013, 26 pages.
U.S. Appl. No. 11/756,313, Office Action, May 1, 2014, 96 pages.
Lan, Tzu-Hsiang, U.S. Appl. No. 14/061,214, Office Action, Jul. 8, 2014, 24 pgs.
Araque Jr, Gerardo, U.S. Appl. No. 11/756,313, Office Action, Sep. 16, 2014, 51 pgs.
Wai, Eric Charles, U.S. Appl. No. 11/756,367, Office Action, Sep. 10, 2014, 10 pgs.
U.S. Appl. No. 14/061,214, Final Office Action dated Nov. 8, 2014, (IBME-0297-CON), 36 pages.
U.S. Appl. No. 11/756,367, Office Action, Apr. 23, 2014, 16 pages.
U.S. Appl. No. 11/756,313, Final Office Action 3 dated Feb. 5, 2015, (IBME-0290), 101 pgs.
U.S. Appl. No. 11/756,367, Final Office Action 3 dated Mar. 24, 2015, (IBME-0283), 16 pgs.
U.S. Appl. No. 11/756,367, Notice of Allowance dated Jun. 10, 2015, 22 pages.

* cited by examiner

DISCRETE, DEPLETING CHIPS FOR OBTAINING DESIRED SERVICE LEVEL CHARACTERISTICS

CROSS-REFERENCE TO RELATED APPLICATIONS

This application is related in some aspects to commonly owned patent application Ser. No. 11/756,367 filed May 31, 2007, entitled "RESOURCE MANAGEMENT FRAMEWORK", filed concurrently herewith, the entire contents of which are herein incorporated by reference.

This application is related in some aspects to commonly owned patent application Ser. No. 11/756,360 filed May 31, 2007, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,375 filed May 31, 2007, entitled "NON-DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,325 filed May 31, 2007, entitled "FLUID, DEPLETING CHIPS FOR OBTAINING DESIRED SERVICE LEVEL CHARACTERISTICS", filed concurrently herewith, the entire contents of which are herein incorporated by reference.

FIELD OF THE INVENTION

The present invention generally relates to the brokering of biddable resources (e.g., computational resources). Specifically, the present invention addresses the need for using discrete, depleting chips for obtaining desired service level characteristics.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). To this extent, none of the existing approaches address how much resources a particular party is allowed to consume. That is, none of the existing approaches provide a way to adequately ration a party the computational resources in a way that will fulfill its needs, while not preventing the needs of other parties' from being met. Accordingly, there exists a need in the art to overcome the deficiencies and limitations described hereinabove.

SUMMARY OF THE INVENTION

The application of the present invention generally provides details on the nature of discrete, depleting chips, wherein discrete chips deplete from a maximum allocated amount but may, in an optional implementation, be allowed to be replenished through the purchase of additional chips. A number of chips are assigned to a requestor/party, such as a business unit (BU), which could be a department, or group providing like-functionality services. In one implementation, the chips themselves could represent base monetary units integrated over time.

In this concept, the number of chips is depleted over some period of time, which helps to balance the requestor's relationship with the resource unit broker. That is, when a party bids a certain amount of chips for a computational resource, and that party's bid is accepted, its total quantity of chips will be debited by the amount of chips bid. Using a chip maximum over a finite duration, e.g. 10,000 chips over one month, implies that the requestor has until the end of the period of time to utilize all of its chips to attempt to win bids for elemental bidding resources (EBRs). Again, the requestor may optionally be allowed to acquire additional chips if it depletes it's supply prior to the end of the allocation period. The method of acquiring new chips would depend on existing business policies or practices, and is not the focus of this application. This chip management mechanism would be leveraged in conjunction with the concepts and algorithms provided in other applications, for the purposes of brokering an exchange of chips for EBRs during periods of high resource demand.

A first aspect of the present invention provides a method for allocating a supply of discrete, depleting chips for obtaining desired service level characteristics, comprising: allocating a party a fixed quantity of chips for bidding on a computational resource; receiving a bid for the computational resource using an amount of the fixed quantity of chips pursuant to a discrete event for the computational resource; and debiting the fixed quantity of chips by the amount in response to the party being awarded the computational resource.

A second aspect of the present invention provides a system for allocating a supply of discrete, depleting chips for obtaining desired service level characteristics, comprising: a system for allocating a party a fixed quantity of chips for bidding on a computational resource; a system for receiving a bid for the computational resource using an amount of the fixed quantity of chips pursuant to a discrete event for the computational resource; and a system for debiting the fixed quantity of chips by the amount in response to the party being awarded the computational resource.

A third aspect of the present invention provides a program product stored on a computer readable medium for allocating a supply of discrete, depleting chips for obtaining desired service level characteristics, the computer readable medium comprising program code for causing a computer system to: allocate a party a fixed quantity of chips for bidding on a computational resource; receive a bid for the computational resource using an amount of the fixed quantity of chips pursuant to a discrete event for the computational resource; and debit the fixed quantity of chips by the amount in response to the party being awarded the computational resource.

A fourth aspect of the present invention provides a method for deploying a system for allocating a supply of discrete, depleting chips for obtaining desired service level characteristics, comprising: providing a computer infrastructure being operable to: allocate a party a fixed quantity of chips for bidding on a computational resource; receive a bid for the computational resource using an amount of the fixed quantity of chips pursuant to a discrete event for the computational resource; and debit the fixed quantity of chips by the amount in response to the party being awarded the computational resource.

A fifth aspect of the present invention provides computer software embodied in a propagated signal for allocating a supply of discrete, depleting chips for obtaining desired service level characteristics, the computer software comprising instructions for causing a computer system to: allocate a party a fixed quantity of chips for bidding on a computational resource; receive a bid for the computational resource using an amount of the fixed quantity of chips pursuant to a discrete event for the computational resource; and debit the fixed quantity of chips by the amount in response to the party being awarded the computational resource.

A sixth aspect of the present invention provides a data processing system for allocating a supply of discrete, depleting chips for obtaining desired service level characteristics, comprising: a memory medium; a bus coupled to the memory medium; and a processing unit coupled to the bus, the memory medium comprising program code, which when executed by the processing unit, causes the data processing system to: allocate a party a fixed quantity of chips for bidding on a computational resource; receive a bid for the computational resource using an amount of the fixed quantity of chips pursuant to a discrete event for the computational resource; and debit the fixed quantity of chips by the amount in response to the party being awarded the computational resource.

For each of these aspects, the following additional features/functions can be provided: the party can be a business unit or the like; the bid can be received pursuant to a scheduled auction for the computational resource; the bid can be one of a plurality of bids received pursuant to the scheduled auction for the computational resource; the fixed quantity of chips can be allocated pursuant to a business transaction such as a financial transaction; the bid can be received by a resource unit broker from an agent acting on behalf of the party; the resource unit broker can select from a plurality of available algorithms for identifying a winner of the computational resource, and/or the like.

BRIEF DESCRIPTION OF THE DRAWINGS

These and other features of this invention will be more readily understood from the following detailed description of the various aspects of the invention taken in conjunction with the accompanying drawings in which.

Figure 1:
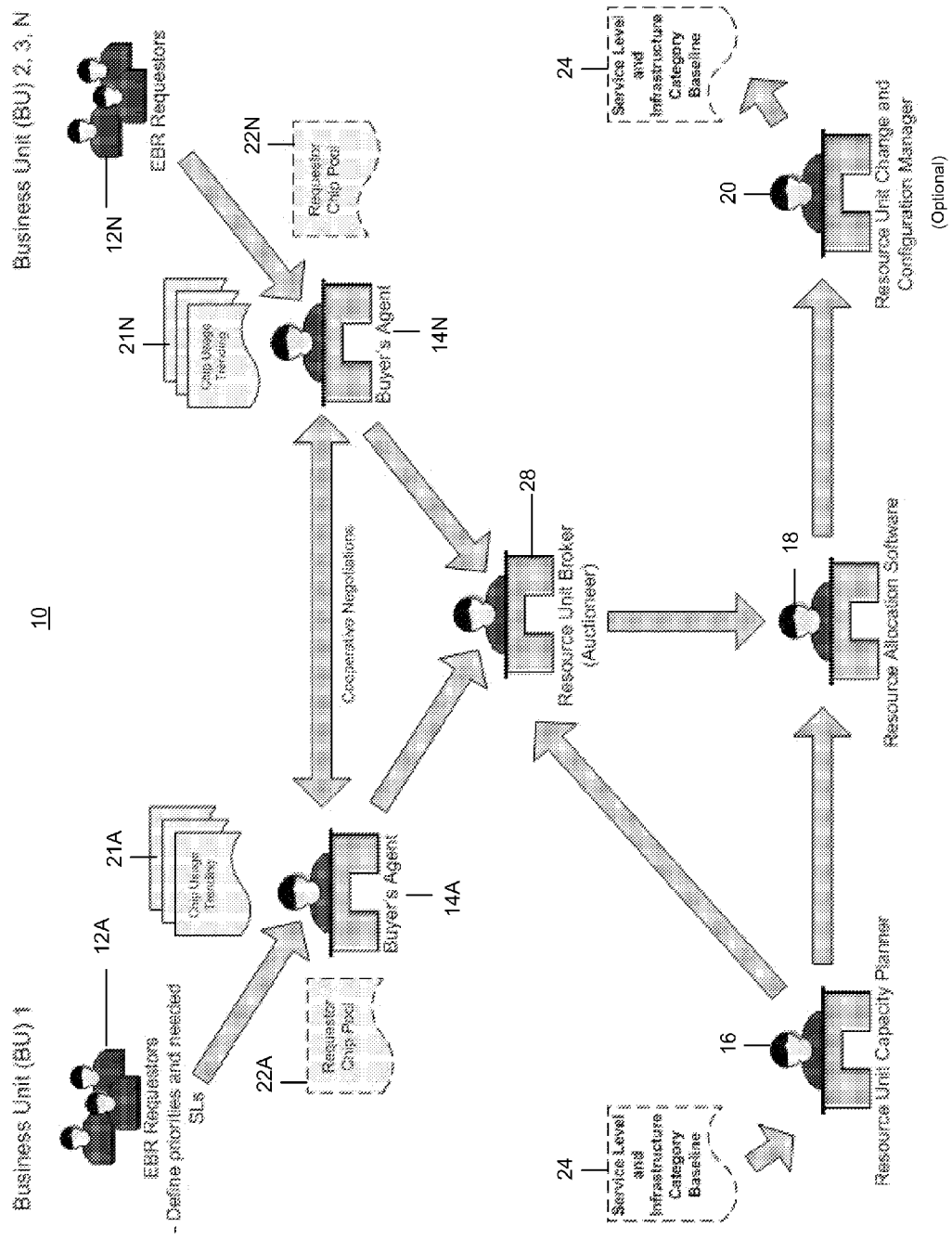
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation I. General Description As used herein, the following terms have the following definitions:

"Chip" means any unit (virtual or otherwise) that may be exchanged for resources such as IT resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc.) sought by a party to accomplish objectives.

As indicated above, the present invention provides details on the nature of discrete, depleting chips, wherein discrete chips deplete from a maximum allocated amount but may, in an optional implementation, be allowed to be replenished through the purchase of additional chips. A number of chips are assigned to a requestor/party, known as a business unit (BU), which could be a department, or group providing like-functionality services. In one implementation, the chips themselves could represent base monetary units integrated over time.

In this concept, the number of chips is depleted over some period of time, which helps to balance the requestor's relationship with the resource unit broker. That is, when a party bids a certain amount of chips for a computational resource, and that party's bid is accepted, its total quantity of chips will be debited by the amount of chips bid. Using a chip maximum over a finite duration, e.g. 10,000 chips over one month, implies that the requestor has until the end of the period of time to utilize all of its chips to attempt to win bids for elemental biddable resources (EBR). Again, the requestor may optionally be allowed to acquire additional chips if it depletes it's supply prior to the end of the allocation period. The method of acquiring new chips would depend on existing business policies or practices, and is not the focus of this application. This chip management mechanism would be leveraged in conjunction with the concepts and algorithms provided in other applications, for the purposes of brokering an exchange of chips for EBRs for periods of high resource demand.

Referring now to FIG. 1, a resource management framework (hereinafter framework 10) is depicted as described in Ser. No. 11/756,367, which was cross-referenced and incorporated above. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip usage trending 21A-N, requestor chip pool 22A-N, and service level and infrastructure category baseline 24.

An objective of this framework is to reach a means of maximizing utilization of IT Resources among competing consumers such as business units 12A-B by distribution of the decision making/allocation process according to relative needs of applications. Doing so eliminates the need for traditional SLAs, and allows each business unit to make dynamic "free market" decisions as to how best to obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business units' 12A-N behalf. Various methods can be employed by the resource unit broker 28 to fulfill requests for resources to consumers or business units 12A-N. One method is using non-depleting chips (as further described in Ser. No. 11/756,374, which was cross-referenced and incorporated above), and yet another involves the use of fluid chips (as further described in Ser. No. 11/756,325, which was cross-referenced and incorporated above). Another method is described herein and involves using depleting chips for static or discrete events. Regardless, the buyers' agents 14A-N understand the thresholds business units 14A-N are willing to pay, their associated targets for various service level characteristics, and will programmatically employ the most advantageous bidding strategy.

The resource unit capacity planner 16 reports to resource unit brokers 28 (i.e., auctioneers) what resources are available (e.g., infrastructure components) at any given time. Resource allocation software 18 includes products such as Enterprise Workload manager (EWLM), WebSphere XD, and Partition Load Manager (EWLM, Enterprise Workload Manager, WebSphere XD, and Partition Load Manage are trademarks of IBM Corp. in the United States and/or other countries). The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by optional resource unit change and configuration manager 20.

As indicated above, the present invention involves the management and/or allocation of discrete, depleting chips to parties such as business units 12A-N. That is, business units 12A-N will be allocated a certain/fixed quantity of chips pursuant to a business transaction (e.g., a financial transaction). Those chips can then be used for bidding in an attempt to be allocated computational resources. Under an embodiment of the present invention, the chips are considered discrete because they are intended to be used in a scheduled event such as a scheduled auction. In this regard, auction winners are granted resources for known periods of time, and can thus base future decisions on the knowledge that they are ensured the desired resources for the duration of the allocation cycle.

Consider, for the sake of simplicity, the case where only two business units are competing for IT resources. These business units will be known simply as BU1 and BU2, and each is represented by its own respective agent software. In the discrete chip model, again, periodic auctions are held, and winners determined for the duration of the allocation cycle, such that resources are distributed accordingly. Specifically, agents 14A-N will submit bids on behalf of business units 12A-N. Each bid is for an amount (e.g., one or more) of chips that were allocated to business units 12A-N. It should be noted that each business unit 12A-N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined above.

Figure 2:
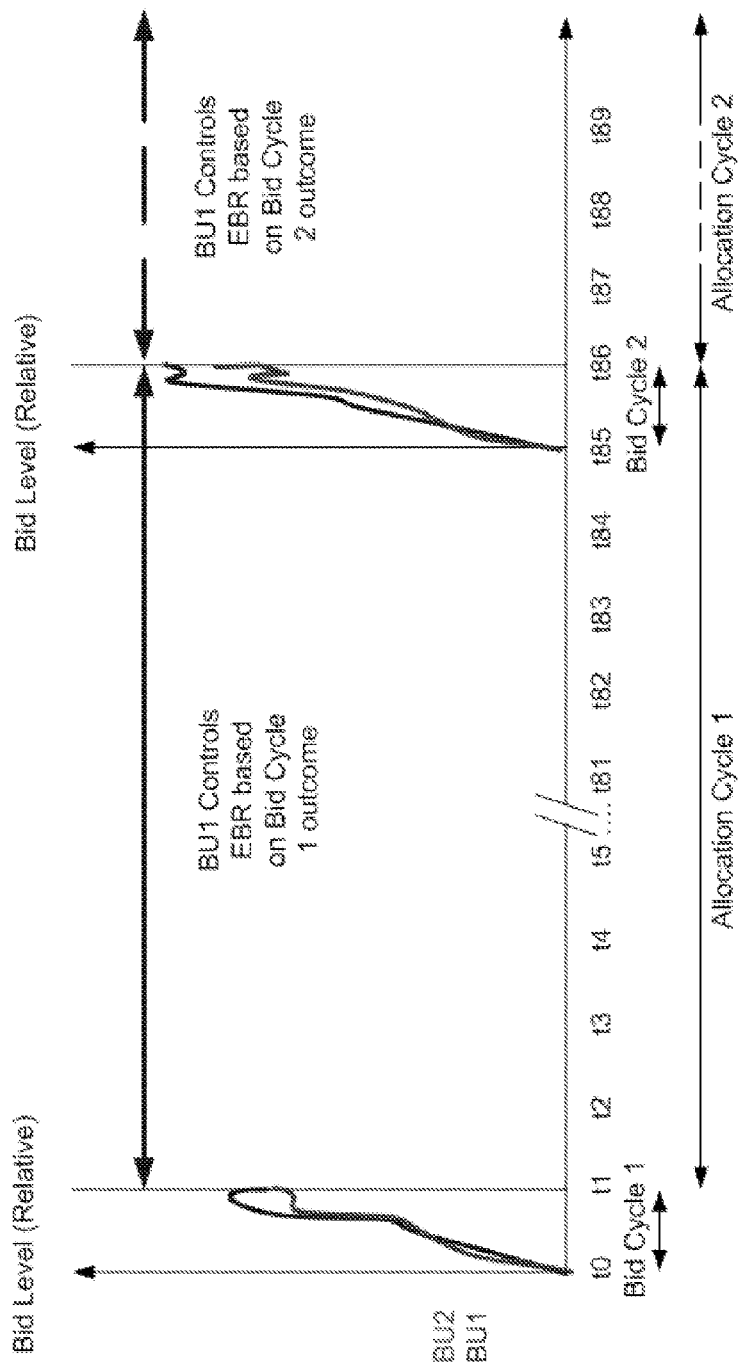
FIG. 2 shows an illustrative graph of an allocation cycle according to the present invention.

Referring now to FIG. 2, an illustrative graph of an allocation cycle is shown. In this example, for instance, BU1 is the high bidder for resources at time t1. In a fluid event scenario (e.g., an un-scheduled auction) case, this would not guarantee BU1 use of the "won" resource(s) for any particular period of time, but in this discrete chip case, a time guarantee equating to the "allocation cycle" is given. Thus, depending on the allocation strategy, BU1 may have a complete monopoly over the resource(s), or such resources may be shared with BU1 receiving the majority.

It should be noted that the time scale shown in FIG. 2 is not meant to be specific, but rather indicative of a short/long dichotomy between the bid cycle and the overall allocation cycle. Furthermore, in this case, BU1's (and/or BU2's) expenditure of chips equates to a series of discontinuous expenses equating to the amount bid at the end of each respective bid cycle. Note that again, whether or not BU2 is charged for its "losing" bid depends on the various allocation strategies. In some eventualities, it may be charged and in others, not.

Note that for all chip management systems, including this one, cooperative behavior may optionally first be tried before bidding competition ensues. Note furthermore that three allocation strategies follow, and in fact influence, the bidding process. Any of these strategies may be implemented, according to the behavior that is deemed optimal for the adopting organization.

These strategies are as follows:

"Winner Take All" Allocation: In this approach, the business unit with the highest bid is allocated all requested IT resources. No other business units receive IT resources (EBRs), until the next winner is determined at the end of the next bid cycle. With the discrete, depleting chip approach outlined herein, this has the practical effect of determining whichever business unit wins a particular bid cycle will receive full use of the IT resource under bid for the duration of the subsequent allocation cycle. Such a resource (the EBR) could be a given machine, a given number of processors, memory, input/output capability, or any other such elemental bidding resource. It should be noted, of course, that within any given closed system of Business Units, early "wins" of resources within a distribution cycle indicate greater expenditures of chips. Thus, all things being equal, such BUs may have fewer chips with which to compete later in the distribution cycle. For example, heavy bids in a month-long chip distribution cycle may hinder the ability of the BU to compete for resources late in the month.

Figure 3:
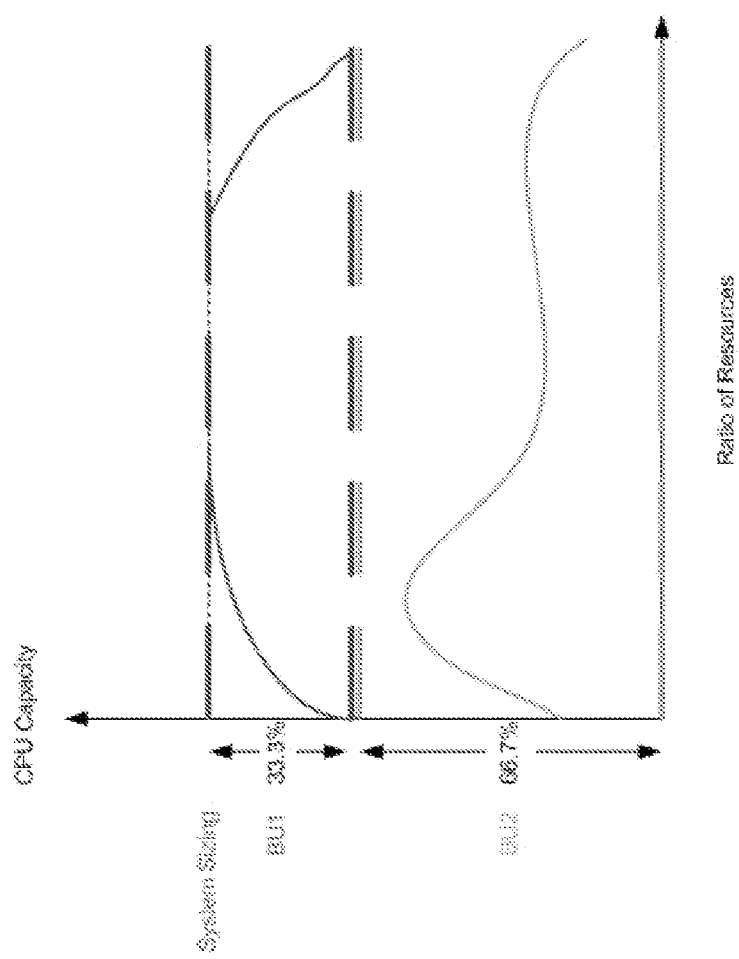
FIG. 3 shows an illustrative graph of a ratio of resource allocation according to the present invention.

"Ratio of Resources" Allocation: In this approach, the requested resources are allocated for the full allocation cycle according to a ratio of bids between competing business units. An example of this is shown in FIG. 3 where two competing BUs are bidding on a resource, and the ratio of relative bids at the end of the bid cycle is 2/1 between Business Unit 2 and Business Unit 1, respectively. In this case, BU 2 gets 66.7% of the requested resource, and BU1 gets 33.3% of the requested resource. From FIG. 3, it can be observed that the competing business units each get their own share of the overall capacity, regardless of their moment-by-moment computing needs. In this illustrated case, BU1s application runs into a CPU constraint for part of the allocation cycle, as noted by the time during which it is utilizing its share of the capacity at 100%.

Figure 4:
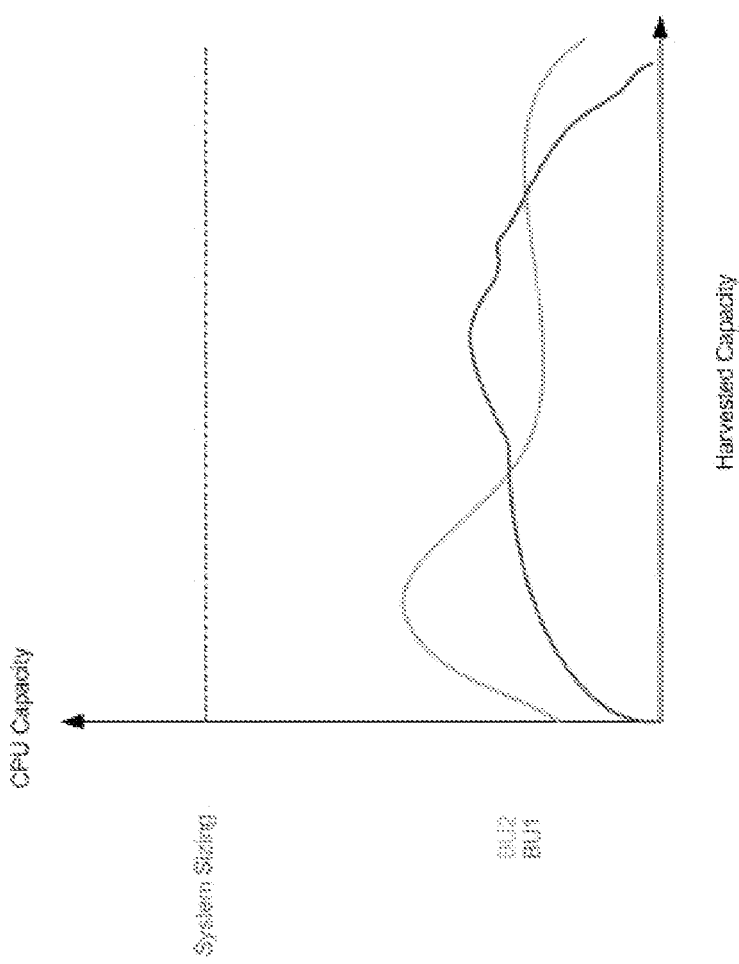
FIG. 4 shows an illustrative graph of a harvested capacity allocation according to the present invention.

"Harvested Capacity (HC)" Allocation: This approach is generally shown in FIG. 4 and has some similarities with the "winner take all" approach; in that the BU placing the highest bid at any given time gets all the capacity it needs for the duration in which its bid is the highest. However, in the harvested capacity approach, any remaining resources after the winner takes what it needs are available and may be "skimmed" for use by other BUs. In this discrete, depleting chip scenario, the differentiation between the "ratio of resources" approach and "harvested capacity" may be viewed through a graphical comparison with the above approach. In the HC approach, BU1's processor resource constraint is eased by permitting BU1 to obtain more than 33.3% of the resources, but only if (as in this case) BU2 is not currently constrained. The down-side to harvested capacity, however, is that more overhead computations may be required to continually calculate the resource availability, and a slight hysteresis may exist wherein the decision to allow BU1 (the bid loser) to take resources at the next incremental moment is based upon BU2's (the bid winner) needs from the just-past incremental moment.

Therefore, the specification and quantification of these discrete, depleting chips may occur through a number of methods, but their measure in use by the system may be thought of as a series of discrete expenditures, in which either the winning bidder only is charged or each BU (winning or losing) is charged, depending on the allocation strategy pursued. As mentioned for other chip strategies (e.g., as incorporated by reference), several fundamental implementation options exist for practical use of this system. In one case, a business unit within an organization may receive through executive sponsor a specified amount of chips for a given period of time, and that is all the chips it receives until the next replenishment date. In another case, a business unit may receive through executive sponsor a specified amount of chips for a given period of time, and then additional chips may be purchased through discretionary expenditures authorized by the business unit. In a third option, the chips may be equated to simple fiscal terms, and the free market will determine the relative "wealth" of competing business units. This last approach would generally be best suited for true competitive situations, in which the BU's are not necessarily part of the same broader organization with shared goals.

II. Computerized Implementation

Figure 5:
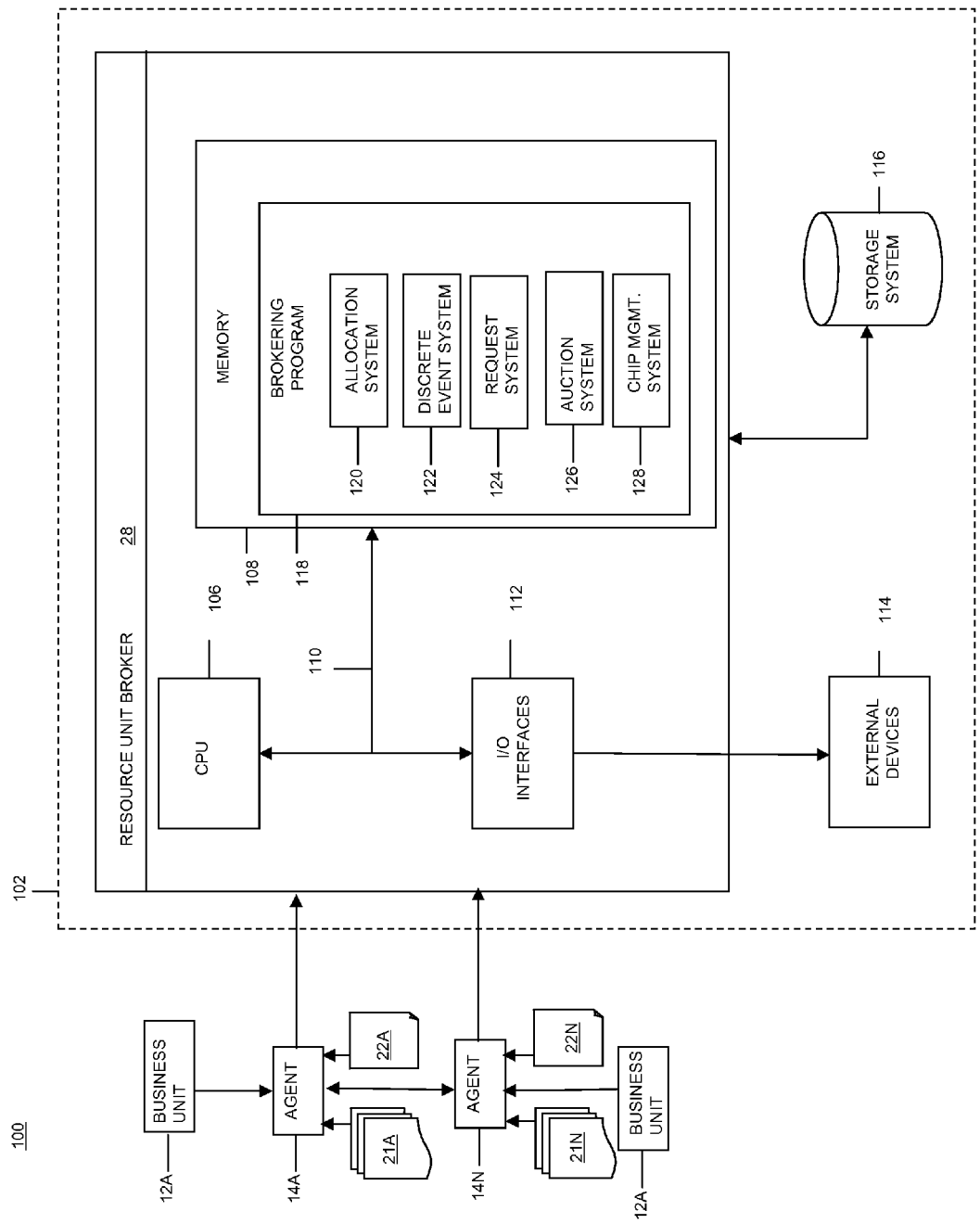
FIG. 5 shows a more detailed computerized implementation of the present invention.

Referring now to FIG. 5, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as brokering program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, resource unit broker 28 is only representative of various possible computer systems that can include numerous combinations of hardware. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 5 can be included in resource unit broker 28. However, if resource unit broker 28 comprises a handheld device or the like, it is understood that one or more external devices 114 (e.g., a display) and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28. It should be understood that resource unit capacity planner 16, resource allocation software 18, and change and configuration manager 20 have not been shown in FIG. 5 for clarity purposes.

Shown in memory 108 of resource unit broker 28 is brokering program 118, which facilitates the functions of resource unit broker 28 as described herein. It should be understood that brokering program 118 can include any of the subsystems shown in the above-incorporated applications. Those shown in FIG. 5 have been depicted to illustrate the core functions of the discrete, depleting chip model of the present invention. As depicted, brokering program 118 includes allocation system 120, discrete event system 122, request system 124, auction system 126, and chip management system 128. It should be understood that this configuration of functionality is intended to be illustrative only, and that identical or similar functionality could be provided with a different configuration of systems.

In any event, brokering program 118 facilitates the functions as described herein. Specifically, allocation system 120 is configured to allocate a party a fixed quantity of chips for bidding on a computational resource. This can incorporate details of a business transaction between the party and a chip source such as a financial exchange for a fixed quantity of chips. Discrete event system 122 is configured to schedule events such as auctions for computational resources, and can be used in conjunction with any calendar/email application (e.g., Lotus Notes; Lotus, Notes, and Lotus Notes are trademarks of IBM Corp. in the United States and/or other countries) to manage invites and responses, and maintain a calendar of events. Request system 124 is configured to receive and manage bids (from agents on behalf of the parties) for computational resources. As mentioned above, the bids will comprise an amount of the fixed quantity of chips allocated to a party. Auction system 126 will keep track of the bids (and counter bids) and determine a winner of the auction. It can do so using any of the above-referenced (and/or incorporated) strategies and associated algorithms. Chip management system 128 is configured to manage the quantity of chips allocated to the parties, including debiting the fixed quantity of chips allocated to a party by the amount bid by that party in response to the party being awarded the computational resource.

For example, in one embodiment, the invention provides a computer-readable/useable medium that includes computer program code to enable a computer infrastructure to allocate resources using depleting chips. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to allocate resources based on non-depleting chips. In this case, the service provider can create, maintain, support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for allocating resources based on depleting chips. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for allocating a supply of discrete, depleting chips for obtaining desired service level characteristics, comprising:
    allocating a first party a fixed quantity of chips and a second party a different quantity of chips for a pre-determined allocation cycle time period, the fixed quantity of chips and the different quantity of chips being based on financial transactions of the party and the second party, the chips for bidding on a computational resource having service level characteristics;

receiving a first bid for the computational resource using an amount of the fixed quantity of chips pursuant to a discrete event for the computational resource and receiving a second bid using an amount of the different quantity of chips pursuant to the discrete event, the first and second bids being received by a resource unit broker, the resource unit broker identifying a winner of the computational resource utilizing a ratio of resources allocation, wherein the winner receives a ratio of the computational resource equal to the ratio of a total bid from all parties, the ratio of the computational resource comprising a percentage of an overall capacity of a CPU resource;

wherein the first bid is received from a first agent representing the first party and the second bid is received from a second agent representing the second party, wherein the first and second agent engage in cooperative or competitive negotiations on behalf of the first and second party;

debiting the fixed quantity of chips by the amount of the first bid in response to the first party being awarded the ratio of the computational resource for a pre-determined duration and debiting the different quantity of chips by the amount of the second bid in response to the second party being awarded the ratio of the computational resource for the pre-determined duration;

receiving a third bid for the computational resource using a third amount of the fixed quantity of chips left from the debiting pursuant to a second discrete event for the computational resource subsequent to the pre-determined duration during the pre-determined allocation cycle; and debiting the fixed quantity of chips left from the debiting by the third amount in response to the first party being awarded the ratio of the computational resource for the pre-determined duration.

2. The method of claim 1, the discrete event being a scheduled auction for the computational resource.

3. The method of claim 2, the first bid being one of a plurality of bids received pursuant to the scheduled auction for the computational resource.

4. The method of claim 1, the allocating comprising allocating the first party the fixed quantity of chips pursuant to a business transaction.

5. The method of claim 4, the business transaction being a financial transaction.

6. The method of claim 1, the first party being a business unit.

7. The method of claim 1, the first bid being received by the resource unit broker from the first agent acting on behalf of the first party.

8. A system for allocating a supply of discrete, depleting chips for obtaining desired service level characteristics, comprising:

a set of computer devices having at least one computer device, the set of computer devices performing a method, including:

allocating a first party a fixed quantity of chips and a second party a different quantity of chips for a pre-determined allocation cycle time period, the fixed quantity of chips and the different quantity of chips being based on financial transactions of the party and the second party, the chips for bidding on a computational resource;

receiving a first bid for the computational resource using an amount of the fixed quantity of chips pursuant to a discrete event for the computational resource and receiving a second bid using an amount of the different quantity of chips pursuant to the discrete event, the first and second bids being received by a resource unit broker, the resource unit broker identifying a winner of the computational resource utilizing a ratio of resources allocation, wherein the winner receives a ratio of the computational resource equal to the ratio of a total bid from all parties, the ratio of the computational resource comprising a percentage of an overall capacity of a CPU resource;

wherein the first bid is received from a first agent representing the first party and the second bid is received from a second agent representing the second party, wherein the first and second agent engage in cooperative or competitive negotiations on behalf of the first and second party;

debiting the fixed quantity of chips by the amount of the first bid in response to the party being awarded the ratio of the computational resource for a pre-determined duration and debiting the different quantity of chips by the amount of the second bid in response to the second party being awarded the ratio of the computational resource for the pre-determined duration;

receiving a third bid for the computational resource using a third amount of the fixed quantity of chips left from the debiting pursuant to a second discrete event for the computational resource subsequent to the pre-determined duration during the pre-determined allocation cycle; and debiting the fixed quantity of chips left from the debiting by the third amount in response to the first party being awarded the ratio of the computational resource the pre-determined duration.

9. The system of claim 8, the discrete event being a scheduled auction for the computational resource.

10. The system of claim 9, the first bid being one of a plurality of bids received pursuant to the scheduled auction for the computational resource.

11. The system of claim 8, the fixed quantity of chips being allocated pursuant to a business transaction.

12. The system of claim 11, the business transaction being a financial transaction.

13. The system of claim 8, the first party being a business unit.

14. The system of claim 8, the first bid being received by the resource unit broker from the first agent acting on behalf of the first party.

15. A program product stored on a non-transitory computer readable storage medium for allocating a supply of discrete, depleting chips for obtaining desired service level characteristics, the non-transitory computer readable storage medium comprising program code for causing a computer system to:

allocate a first party a fixed quantity of chips and a second party a different quantity of chips for a pre-determined allocation cycle time period, the fixed quantity of chips and the different quantity of chips being based on financial transactions of the party and the second party, the chips for bidding on a computational resource having service level characteristics;

receive a first bid for the computational resource using an amount of the fixed quantity of chips pursuant to a discrete event for the computational resource and receiving a second bid using an amount of the different quantity of chips pursuant to the discrete event, the first and second bids being received by a resource unit broker, the resource unit broker identifying a winner of the computational resource utilizing a ratio of resources allocation, wherein the winner receives a ratio of the computational resource equal to the ratio of a total bid from all parties, the ratio of the computational resource comprising a percentage of an overall capacity of a CPU resource;

wherein the first bid is received from a first agent representing the first party and the second bid is received from a second agent representing the second party, wherein the first and second agent engage in cooperative or competitive negotiations on behalf of the first and second party;

debit the fixed quantity of chips by the amount of the first bid in response to the party being awarded the ratio of the computational resource for a pre-determined duration and debiting the different quantity of chips by the amount of the second bid in response to the second party being awarded the ratio of the computational resource for the pre-determined duration;

receive a third bid for the computational resource using a third amount of the fixed quantity of chips left from the debiting pursuant to a second discrete event for the computational resource subsequent to the pre-determined duration during the pre-determined allocation cycle; and debit the fixed quantity of chips left from the debiting by the third amount in response to the first party being awarded the ratio of the computational resource the pre-determined duration.

16. The program product of claim 15, the discrete event being a scheduled auction for the computational resource.

17. The program product of claim 16, the first bid being one of a plurality of bids received pursuant to the scheduled auction for the computational resource.

18. The program product of claim 15, the fixed quantity of chips being allocated pursuant to a business transaction.

19. The program product of claim 18, the business transaction being a financial transaction.

20. The program product of claim 15, the first party being a business unit.

21. The program product of claim 15, the first bid being received by the resource unit broker from the first agent acting on behalf of the first party.

22. A method for deploying a system for allocating a supply of discrete, depleting chips for obtaining desired service level characteristics, comprising:

providing a computer infrastructure being operable to:

allocate a first party a fixed quantity of chips and a second party a different quantity of chips for a pre-determined allocation cycle time period, the fixed quantity of chips and the different quantity of chips being based on financial transactions of the party and the second party, the chips for bidding on a computational resource having service level characteristics;

receive a first bid for the computational resource using an amount of the fixed quantity of chips pursuant to a discrete event for the computational resource and receiving a second bid using an amount of the different quantity of chips pursuant to the discrete event, the first and second bids being received by a resource unit broker, the resource unit broker identifying a winner of the computational resource utilizing a ratio of resources allocation, wherein the winner receives a ratio of the computational resource equal to the ratio of a total bid from all parties, the ratio of the computational resource comprising a percentage of an overall capacity of a CPU resource;

wherein the first bid is received from a first agent representing the first party and the second bid is received from a second agent representing the second party, wherein the first and second agent engage in cooperative or competitive negotiations on behalf of the first and second party;

debit the fixed quantity of chips by the amount of the first bid in response to the party being awarded the ratio of the computational resource for a pre-determined duration and debiting the different quantity of chips by the amount of the second bid in response to the second party being awarded the ratio of the computational resource for the pre-determined duration;

receive a third bid for the computational resource using a third amount of the fixed quantity of chips left from the debiting pursuant to a second discrete event for the computational resource subsequent to the pre-determined duration during the pre-determined allocation cycle; and debit the fixed quantity of chips left from the debiting by the third amount in response to the first party being awarded the ratio of the computational resource the pre-determined duration.

23. The method of claim 22, the first bid being received pursuant to a scheduled auction for the computational resource, and the first bid being one of a plurality of bids received pursuant to the scheduled auction for the computational resource.

* * * * *